(No Model.)

C. IMSE.
COMBINED HASSOCK AND COMMODE.

No. 245,833.        Patented Aug. 16, 1881.

Attest:
Charles Pickles
Geo. H. Knight.

Inventor:
Charles Imse
By Knight Bro.
Attys.

UNITED STATES PATENT OFFICE.

CHARLES IMSE, OF ST. LOUIS, MISSOURI.

COMBINED HASSOCK AND COMMODE.

SPECIFICATION forming part of Letters Patent No. 245,833, dated August 16, 1881.

Application filed May 10, 1881. (No model.)

*To all whom it may concern:*

Be it known that I, CHARLES IMSE, of the city of St. Louis, in the State of Missouri, have invented a certain new and useful Improvement in Combined Hassock and Commode, of which the following is a full, clear, and exact description, reference being had to the accompanying drawings, forming part of this specification.

The first part of this invention consists in the combination, in a hassock or foot-stool, of a seat-board cover and a pot for the reception of the excrement.

The second part of my invention consists in making such hassock with a removable bottom, to which the pot is attached in its preferred form.

Figure 1:
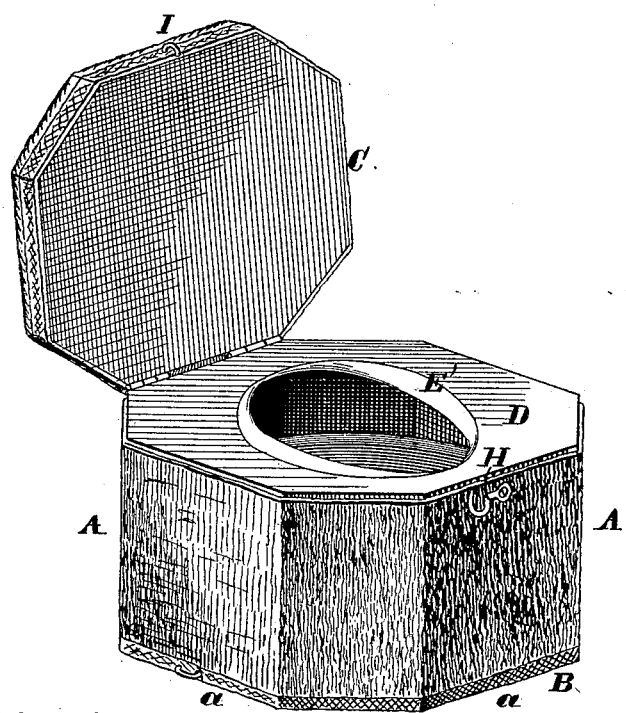
Figure 2:
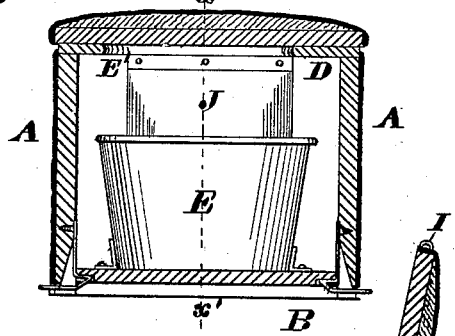
Figure 3:
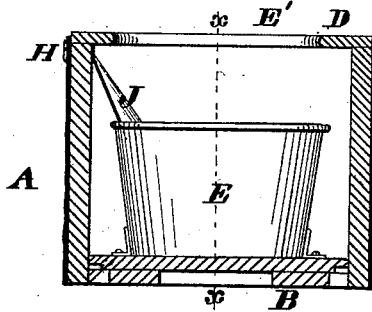

In the drawings, Figure 1 is a perspective view. Fig. 2 is a section at $x$ $x$, Fig. 3, showing the hassock closed. Fig. 3 is a section at $x'$ $x'$, Fig. 2, showing the lid up.

I show the hassock of irregular octagon form at the sides A, with a flat bottom, B, and flat or upholstered cover C. D is a fixed seat, having an ordinary aperture at E'.

The sides $a$ are upholstered, so that the article has the appearance of an ordinary hassock when the lid is closed, as shown in Fig. 2.

When the lid is closed down it may be held by a hook and eye, H I.

The bottom B is removable. It is made to slip upward into position, and is held there by spring-catches F, which engage beneath its edges, and which are drawn outward to release the catches by the loops or pins $f$.

E is the pot to receive the excrement. This is attached to the bottom of the hassock, so that it is removable with it.

J is a spout fixed to the inner side of the front wall to prevent urine falling in front of the pot.

The pot may be made of any suitable material, such as sheet-copper or any metal that would not be too subject to corrosion, or of enameled metal, or, in short, of any substance that would not be too heavy or subject to destruction by corrosion or by violence in handling.

The lid or cover C has an extension, $c$, which rests against the back of the box when the cover is open, and holds the cover in a nearly vertical position.

K is a handle, by which the apparatus may be carried from place to place when the pot is empty.

I do not confine myself to any special shape of the hassock or to any particular way of upholstering it.

I claim as new and of my invention—

1. The combination of a hassock with fixed seat and hinged cover and removable bottom B, and the pot E, fixed to the bottom, for the purpose set forth.

2. The hassock having a hinged cover, C, and seat D, and a bottom, B, and pot E, removable downwardly, and engaged, when in the hassock, by catches, substantially as and for the purpose set forth.

CHARLES IMSE.

Witnesses:
SAML. KNIGHT,
GEO. H. KNIGHT.